United States Patent [19]

Ha

[11] Patent Number: 4,829,700

[45] Date of Patent: May 16, 1989

[54] ANIMAL TRAP

[76] Inventor: Heung Y. Ha, 5219 Juliet St., Springfield, Va. 22151

[21] Appl. No.: 147,355

[22] Filed: Jan. 22, 1988

[51] Int. Cl.$^4$ ............................................ A01M 23/18
[52] U.S. Cl. ...................................................... 43/61
[58] Field of Search ................................ 43/61, 60, 67

[56] References Cited

U.S. PATENT DOCUMENTS

| | | | |
|---|---|---|---|
| 1,541,639 | 6/1925 | Gregory | 43/67 |
| 1,747,380 | 2/1930 | McCully | 43/67 |
| 1,862,038 | 6/1932 | Session | 43/67 |
| 2,447,147 | 8/1948 | Warner | 43/61 |
| 2,736,984 | 3/1956 | Deane | 43/61 |
| 4,144,667 | 3/1979 | Souza | 43/61 |
| 4,557,067 | 12/1985 | Ha | 43/61 |

Primary Examiner—Gene P. Crosby
Attorney, Agent, or Firm—Frank P. Presta

[57] ABSTRACT

An animal trap discloses an elongated housing having open and closed ends, and a door pivotally biased to the closed position. A panel is disposed near the closed end of the housing and extends generally laterally within the housing above the bottom thereof. An elongated pawl member is connected at one end with the panel and is pivotally connected at its opposite end to the housing near the open end thereof. The pawl member has a tooth at its opposite end and is urged in an upward direction by a spring member connected thereto and in engagement with the bottom wall of the housing. The tooth is positioned to engage the door when it is moved to the open position to retain the door in the open position. The tooth is movable to a position wherein it releases the door to enable it to be moved to the closed position when an animal enters the housing and steps on the panel to pivotally move it and the pawl member downwardly. A locking member is provided on the housing to releasably lock the door in the closed position. Preferably, the pawl member, panel and spring member are integrally formed in one piece.

12 Claims, 1 Drawing Sheet

ANIMAL TRAP

BACKGROUND OF THE INVENTION

The present invention relates to a new and improved animal trap which can be reused or disposed of without requiring handling of the animal trapped therein.

Heretofore, although most animal traps have generally served their intended purpose, they have been subject to one or more of the following disadvantages:

1. They have been complicated in construction and thus difficult and expensive to manufacture;
2. They have been unreliable in operation;
3. They have been difficult to handle because of their weight or construction;
4. They have been difficult to set because of their construction and, in some cases, have been dangerous to the user in setting them because of a sensitive setting mechanism which can release the trap while being handled by the user; and/or
5. They have been so constructed as to require the handling of a dead animal caught therein if the trap is to be reused.

The animal trap of the present invention is not subject to any of the above-mentioned disadvantages and possesses many advantages not found in the traps in use at present or in the past.

SUMMARY OF THE INVENTION

The animal trap of the present invention is an improvement of the trap disclosed in my U.S. Pat. No. 4,557,067. The animal trap in my prior patent comprises an elongated housing formed of a lightweight, clear material such as plastic which is closed at the sides and one end. At the other end of the housing, a door is pivotally mounted at its lower portion thereon and is biased to a closed position wherein it closes the other end. Inside the housing near the one end thereof a panel is pivotally connected at one end to opposite sides of the housing and extends generally laterally within the housing.

An elongated link or pawl member is pivotally connected at one end with the free end of the panel and extends within the housing along one side thereof toward the door at the other end of the housing. The pawl member is pivotally connected to the adjacent side of the housing at its other end and is provided with a tooth at its other end. Suitable biasing means, such as a spring member, engages the pawl member and urges it upwardly which also causes the panel to assume an inclined position wherein it extends upwardly toward the one end of the housing.

When it is desired to set the trap to catch or kill an animal such as a mouse or the like, unpoisoned or poisoned food is placed within the housing near the one closed end thereof. The door at the other end thereof is pivoted downwardly to an open position wherein its upper free end engages the tooth on the pawl member and moves the pawl member downwardly to a slight extent against the force of the spring member to cause the tooth to move over the adjacent portion of the free end of the door to retain it in the open position.

Thereafter, when an animal enters the open end of the trap to get the food at the closed end thereof, it first steps over the open door which continues to be retained in the open position by the tooth on the pawl member. As the animal advances in the housing toward the food, it steps on the panel which pivots downwardly to cause the pawl member to pivot downwardly to an extent that its tooth moves away from the door to release it. The door then moves to the closed position to trap the animal within the housing. The trap can be conveniently disposed of with the animal enclosed therein, or the animal can be removed from the trap to enable it to be reused.

The new and improved animal trap of the present invention functions in substantially the same manner as the trap disclosed in my prior U.S. Pat. No. 4,557,067. The structure of the present trap is different in that the pawl member and the panel are formed of one-piece construction which substantially reduces cost, improves the operation and greatly simplifies the manufacture and assembly of the trap. The pawl member is pivotally connected at its free end to the side wall of the housing near the open end thereof. The biasing means formed integrally with or connected to the pawl member serves to normally position the tooth of the pawl member for engagement with the door of the housing and also serves to normally position the panel connected to the pawl member in an elevated position relative to the bottom of the housing.

The present trap also comprises a flexible and resilient locking means formed in the housing for releasably locking the door for the housing in a closed position to ensure that the animal cannot get out.

DESCRIPTION OF THE PREFERRED EMBODIMENT

Figure 1:
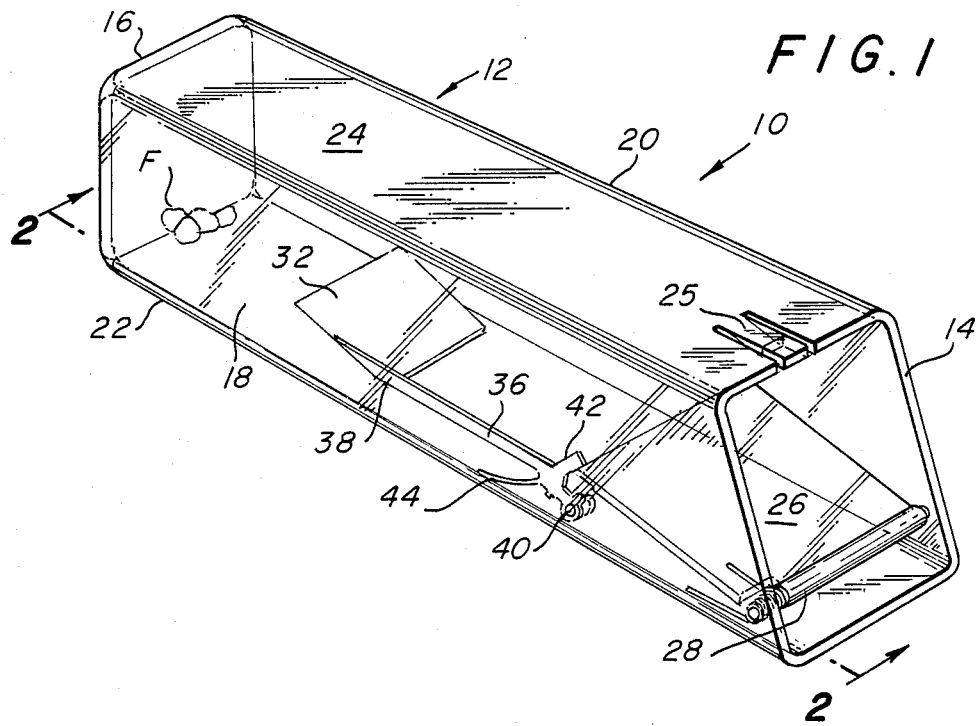
FIG. 1 is a perspective view of an animal trap constructed in accordance with the principles of the present invention, showing the trap in an open or set position.

As shown in the drawing, the animal trap 10 of the present invention comprises an elongated housing 12 formed of any suitable material such as a lightweight, transparent material such as plastic or the like. The housing 12 comprises an open end 14, a closed end 16, side walls 18 and 20, a bottom wall 22 and a top wall 24. The housing 12 may be of any suitable size, depending on the type of animal to be caught therein.

At the open end 14 of the housing 12, a door 26 is pivotally mounted at its lower portion 28 on the side walls 18 and 20 of the housing. A suitable biasing means, such as spring 30, urges the door 26 to the closed position shown in FIG. 3 wherein the door 26 engages the upper wall 24 to close the open end 14 of the housing 12.

Figure 3:
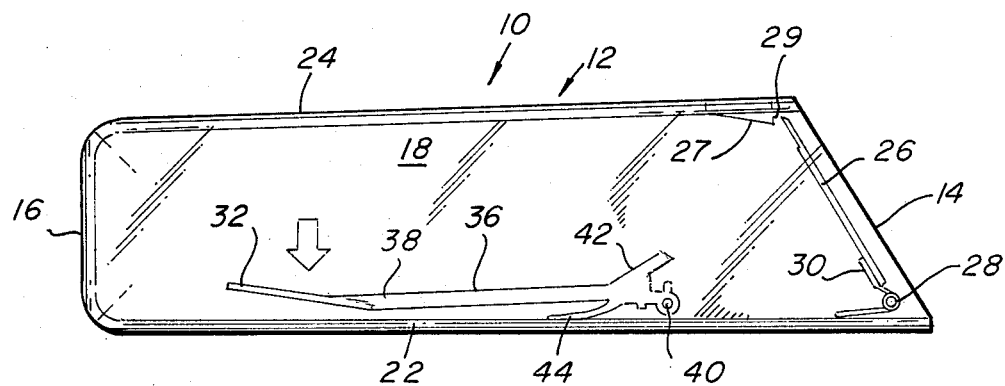
FIG. 3 is a side elevational view similar to FIG. 2, showing the trap in a closed position.

A flexible and resilient locking member or tab 25 is formed in the top wall 24 of the housing near the open end thereof and is provided with an inclined portion 27 and stop 29 on its lower surface for releasably locking the door 26 in the closed position, as shown in FIG. 3.

An elongated link or pawl member 36 is connected at one end 38 with an upwardly inclined panel 32 of slightly less width than the housing. The pawl member 36 extends within the housing along the side 18 thereof toward the door 26 at the open end 14 of the housing. The pawl member 36 is pivotally connected at its opposite end 40 to the side wall 18 and is provided with a tooth 42 of any suitable configuration at the end 40 thereof. Suitable biasing means, such as a leaf spring member 44, is secured to the pawl member 36 and is in engagement with the bottom wall 22 for the purpose of urging the pawl member upwardly which also causes the panel 32 to assume the raised position shown in FIGS. 1 and 2 wherein it is disposed a suitable distance above the bottom wall 22 and extends upwardly toward the closed end 16 of the housing.

When it is desired to set the trap 10 to catch or kill an animal, such as a mouse or the like, unpoisoned or poisoned food F is placed on the bottom wall 22 of the housing near the closed end 16 thereof. The door 26 at the open end 14 of the housing is pivoted downwardly to the open position shown in FIGS. 1 and 2, wherein its upper free end engages the tooth 42 on the pawl member 36 and moves the pawl member downwardly to a slight extent against the force of the spring member 44 to cause the tooth 42 to move over the adjacent portion of the free or upper end of the door to retain it in the open position.

Figure 2:
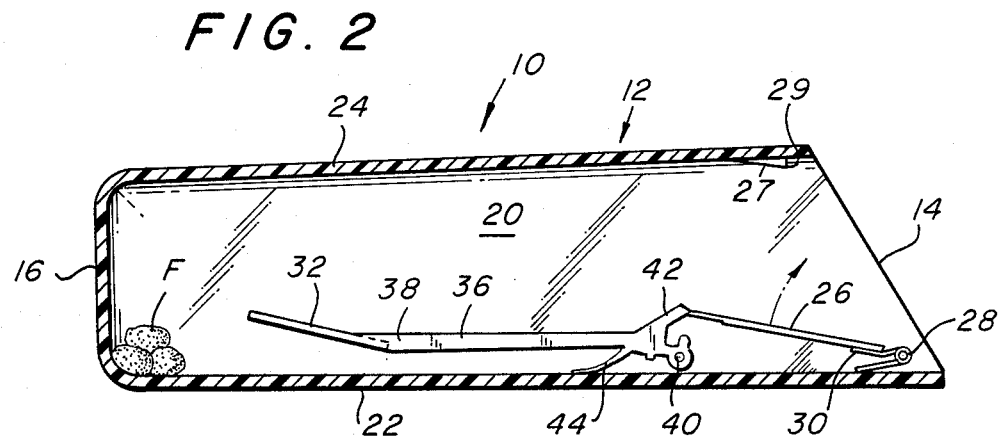
FIG. 2 is an enlarged sectional view taken substantially along line 2—2 in FIG. 1.

Thereafter, when an animal enters the open end 14 of the trap 10 to get the food F at the closed end 16 thereof, it first steps over the open door 26 which continues to be retained in the open position by the tooth 42 on the pawl member 36. As the animal advances in the housing toward the food F, it steps on the panel 32 which pivots downwardly or in a counterclockwise direction as shown in FIG. 2 to cause the pawl member 36 to pivot downwardly (or in a counterclockwise direction as shown in FIG. 2) to an extent that the tooth 42 moves away from the adjacent end of the door 26 to release it. The door 26 is then moved to the closed position shown in FIG. 3 by the spring 30 and is releasably locked in the closed position by the stop 29 on the locking member 25 to trap the animal within the housing 12.

Preferably, the pawl member 36, panel 32 and spring member 44 are formed or molded integrally as one piece from a suitable plastic material. Also, the locking member or tab 25 preferably is formed integrally with the top wall 24 of the housing 12.

From the foregoing description, it will be readily appreciated that the animal trap of the present invention is simple in construction, reliable in operation, easy to set, and can be formed of any suitable lightweight material such as plastic or the like. The trap can be conveniently disposed of with the animal enclosed therein, or the animal can be removed from the trap to enable it to be reused.

I claim:

1. An animal trap, comprising:
   an elongated housing having an open end and a closed end;
   a door pivotally mounted at its lower end on said housing adjacent said open end and movable between an upright closed position wherein it closes said open end and an open position wherein it is disposed within said housing in a substantially laterally extending position near the bottom of said housing;
   means for biasing said door to said closed position;
   an elongated pawl member pivotally connected at one end to said housing near the open end thereof and extending substantially longitudinally within said housing near one side thereof, said pawl member having a tooth at said one end thereof;
   a panel disposed within said housing near the closed end thereof and extending generally longitudinally and laterally within said housing in spaced relation to the bottom thereof, said panel being substantially immovably connected in cantilevered fashion at one end remote from said housing closed end to the adjacent other end of said pawl member; and
   means for urging said pawl member and said panel in an upward direction;
   said tooth being positioned to engage said door when it is moved to said open position to retain said door in said open position, said tooth being movable to a position wherein it releases said door to enable said biasing means to move said door to said closed position when an animal enters said housing and steps on said panel to pivotally move it and said pawl member downwardly.

2. The animal trap of claim 1 wherein said housing and said door are formed of a transparent plastic material.

3. The animal trap of claim 1 wherein said biasing means is a spring engaging said door and said housing.

4. The animal trap of claim 1 wherein said urging means is a spring engaging said housing and connected to said pawl member.

5. The animal trap of claim 1 wherein said housing has a side wall, and said pawl member is disposed adjacent to said side wall and is pivotally connected thereto.

6. The animal trap of claim 1 wherein said pawl member and said panel are integrally formed in one piece of a plastic material.

7. The animal trap of claim 1 wherein said pawl member, said panel and said urging means are integrally formed in one piece of a plastic material.

8. The animal trap of claim 7 wherein said urging means is a leaf-type spring member.

9. The animal trap of claim 1 further comprising means on said housing for releasably locking said door in said closed position.

10. The animal trap of claim 9 wherein said locking means is a flexible and resilient locking member.

11. The animal trap of claim 1 wherein said panel is of a width slightly less than the width of said housing.

12. The animal trap of claim 1 wherein said panel is inclined upwardly in a longitudinal direction from said pawl member toward the closed end of said housing.

* * * * *